United States Patent [19]
Sullivan

[11] Patent Number: 6,032,193
[45] Date of Patent: Feb. 29, 2000

[54] COMPUTER SYSTEM HAVING VIRTUAL CIRCUIT ADDRESS ALTERED BY LOCAL COMPUTER TO SWITCH TO DIFFERENT PHYSICAL DATA LINK TO INCREASE DATA TRANSMISSION BANDWIDTH

[75] Inventor: Mark K. Sullivan, Joplin, Mo.

[73] Assignee: Niobrara Research and Development Corporation, Joplin, Mo.

[21] Appl. No.: 08/821,223

[22] Filed: Mar. 20, 1997

[51] Int. Cl.[7] ........................................... G06F 13/00
[52] U.S. Cl. .................... 709/239; 709/238; 709/242; 370/231; 370/355
[58] Field of Search ..................... 370/471, 230, 370/254, 389, 231, 355; 709/233, 239, 238, 242

[56] References Cited

U.S. PATENT DOCUMENTS

| | | | |
|---|---|---|---|
| 4,550,399 | 10/1985 | Caron | 370/80 |
| 4,862,456 | 8/1989 | Giorgio | 370/118 |
| 4,864,567 | 9/1989 | Giorgio | 370/118 |
| 4,980,897 | 12/1990 | Decker et al. | 375/38 |
| 5,018,136 | 5/1991 | Gollub | 370/471 |
| 5,058,133 | 10/1991 | Duncanson et al. | 375/38 |
| 5,115,309 | 5/1992 | Hang | 358/133 |
| 5,231,649 | 7/1993 | Duncanson | 375/38 |
| 5,293,378 | 3/1994 | Shimizu | 370/94.1 |
| 5,303,267 | 4/1994 | Gupta | 375/38 |
| 5,351,239 | 9/1994 | Black et al. | 370/84 |
| 5,390,239 | 2/1995 | Morris et al. | 379/93 |
| 5,442,457 | 8/1995 | Najafi | 358/400 |
| 5,457,715 | 10/1995 | Sakaki et al. | 375/260 |
| 5,479,447 | 12/1995 | Chow et al. | 375/260 |
| 5,491,695 | 2/1996 | Meagher et al. | 370/112 |
| 5,524,111 | 6/1996 | Le Pennec et al. | 370/84 |
| 5,539,740 | 7/1996 | Brückner | 370/60.1 |
| 5,546,379 | 8/1996 | Thaweethai et al. | 370/17 |
| 5,546,549 | 8/1996 | Barrett et al. | 395/309 |
| 5,550,984 | 8/1996 | Gelb | 395/200.17 |
| 5,745,697 | 4/1998 | Charny et al. | 709/233 |
| 5,768,271 | 6/1998 | Seid et al. | 370/389 |
| 5,781,537 | 7/1998 | Ramaswami et al. | 370/254 |
| 5,784,358 | 7/1998 | Smith et al. | 370/230 |

FOREIGN PATENT DOCUMENTS 61-158226  7/1986  Japan.

OTHER PUBLICATIONS

Postel, J.B., "Transmission Control Protocol," RFC 793, Sep. 1981.
Postel, J.B., "Internet Protocol," RFC 791, Sep. 1991.
Sklower, et al., "The PPP Multilink Protocol (MP)," RFC 1990, Aug. 1996.
Fielding, et al., "Hypertext Transfer Protocol—HTTP/1.1," RFC 2068, Jan. 1997.

*Primary Examiner*—Le Hien Luu
*Attorney, Agent, or Firm*—Senniger, Powers, Leavitt & Roedel

[57] ABSTRACT

A system and method for controlling data transmissions between a remote node and a local node of a computer communications network. The network has a plurality of nodes that are interconnected for the exchange of datagrams defining a plurality of virtual circuits. A plurality of physical data links connected to the local node are used to connect the local node to the network and an interface establishes a connection from the local node to the remote node via a first one of the links. The interface assigns one of the virtual circuits to the first link and assigns another one of the virtual circuits to a second one of the links. The local node receives the remote-to-local datagrams of the assigned virtual circuits via their respective links whereby the collective throughput requirement of the plurality of datagrams is distributed among the plurality of links thereby increasing the speed of data transmission between the remote node and the local node. Other features are also disclosed including correcting checksums in the datagrams.

17 Claims, 5 Drawing Sheets

FIG. 5B

COMPUTER SYSTEM HAVING VIRTUAL CIRCUIT ADDRESS ALTERED BY LOCAL COMPUTER TO SWITCH TO DIFFERENT PHYSICAL DATA LINK TO INCREASE DATA TRANSMISSION BANDWIDTH

BACKGROUND OF THE INVENTION

The present invention generally relates to a system and method for use with a computer network and, particularly, to a computer network interface for distributing data over a plurality of physical links to increase transmission bandwidth and, thus, increase the speed at which the data is transmitted.

The wide area network commonly referred to as the Internet is becoming increasingly popular. Internet connections provide computer users with access to a number of resources, including documents on the World Wide Web, a hypertext-based information service that allows web browser clients to access information from web servers. With an Internet connection, and using specific web browser software, a user can browse the World Wide Web. Examples of such software include Netscape Navigator® and Microsoft Internet Explorer™.

A suite of protocols, referred to as TCP/IP, provides a standardized format for Internet data communication between, for example, a server and client. The TCP/IP protocol suite is named for its two main protocols, i.e., the transmission control protocol (TCP) and the Internet protocol (IP). W. Richard Stevens, *TCP/IP Illustrated, Volume 1: The Protocols,* 1994, the entire disclosure of which is incorporated herein by reference, provides a guide to the TCP/IP protocol suite.

As is known in the art, web documents, or pages, are usually made up of multiple objects such as blocks of text, images, programs, audio clips and/or video clips. A hypertext transfer protocol (HTTP) provides for the transport of bitstreams representing these objects from a remote server to a local client. As provided for by HTTP, only one object is transported at a time. Browser software often opens multiple HTTP sessions over a plurality of TCP/IP virtual circuit connections, thereby loading multiple objects in parallel. Unfortunately, this does not speed up loading of the entire web page because the total bandwidth of the underlying IP connection is divided among the TCP/HTTP connections assigned to loading individual objects.

Computer users desire increased bandwidth for connecting their personal computers and workstations to the Internet. In the context of digital data transmission over computer networks, the term bandwidth refers to the amount of data which can be transmitted over a communications link in a certain period of time and, thus, the amount of time required to transfer a data set.

Point-to-point protocol (PPP) multilink, as described in Sklower et al., "The PPP Multilink Protocol (MP)," RFC 1990, August 1996, defines the present standard for splitting Internet traffic between multiple telephone lines to increase bandwidth. However, PPP multilink, as well as other conventional schemes for splitting Internet traffic, all require special equipment and/or software at both ends of the link (i.e., at the local client end and the remote server end). In particular, PPP multilink multiplexes a number of virtual circuits to a single Internet address and causes the transmitted data packets to be fragmented before transmission. The fragments are then distributed among multiple physical links. As such, the Internet service provider must be configured as a PPP multilink host and be able to, for example, reassemble the fragmented packets.

For this reason, an interface for distributing data over a plurality of physical links which does not require modification of both client and server ends is desired.

SUMMARY OF THE INVENTION

Among the several objects of this invention may be noted the provision of a system and method which increase the speed of computer tasks involving remote network communication; the provision of such system and method which increase the bandwidth available to transfer data through a network communication connection; the provision of such system and method which do not require hardware or software modifications at both ends of the network communication connection; and the provision of such a system which is economically feasible and commercially practical.

Briefly described, a method embodying aspects of the invention is for controlling data transmissions between a remote node and a local node of a computer communications network. The network has a plurality of nodes that are interconnected for the exchange of datagrams defining a plurality of virtual circuits. A plurality of physical data links connected to the local node are used to connect the local node to the network. The method includes the step of establishing a connection from the local node to the remote node via a first link. The method also includes the steps of assigning one of the virtual circuits to the first link and assigning another one of the virtual circuits to a second link. Further, the method includes receiving the remote-to-local datagrams of the assigned virtual circuits via their respective links. As such, the collective throughput requirement of the plurality of datagrams is distributed among the plurality of links thereby increasing the speed of data transmission between the remote node and the local node.

Another embodiment of the invention is directed to a method of controlling data transmissions between a remote node and a local node of a computer communications network. The network has a plurality of nodes that are interconnected for the exchange of datagrams defining a plurality of virtual circuits. Each of the datagrams comprise a plurality of words. One of the words represents address data corresponding to one of the links and another one of the words represents a checksum for use in error detection. A plurality of physical data links connected to the local node are used to connect the local node to the network. The method includes the steps of assigning one of the virtual circuits to a first link and assigning another one of the virtual circuits to a second link. The method also includes the step of altering the source and destination address data in the datagrams defining the virtual circuit assigned to the second link so that it corresponds to the second link rather than to the first link. Further, the method includes the step of altering the checksum in each of the datagrams defining the virtual circuit assigned to the second link so that it is a function of the address data corresponding to the second link rather than the address data corresponding to the first link.

In yet another embodiment, a system embodying aspects of the invention is for communicating with a remote node of a computer communications network. The network has a plurality of nodes that are interconnected for the exchange of datagrams. The system includes a local node and a plurality of physical data links connected to the local node. The links connect the local node to the network for transmitting datagrams to and receiving datagrams from the remote node. These datagrams define a plurality of virtual circuits between the nodes. The system also includes an interface between the local node and the links for establishing a connection from the local node to the remote node via a first link. The interface assigns one of the virtual circuits to the first link and assigns another one of the virtual circuits to a second link. The local node receives the remote-to-local datagrams of the assigned virtual circuits via their respective links. As such, the collective throughput requirement of the plurality of datagrams is distributed among the plurality of links thereby increasing the speed of data transmission between the remote node and the local node.

In yet another embodiment, an improvement embodying aspects of the invention is for use in a system controlling data transmissions between a remote node and a local node of a computer communications network. The network has a plurality of nodes that are interconnected for the exchange of datagrams defining a plurality of virtual circuits. A plurality of physical data links connected to the local node are used to connect the local node to the network. The improvement is an interface which includes a routine for assigning one of the virtual circuits to the first link and a routine assigning another one of the virtual circuits to a second link. Further, the interface includes a routine for altering the address data in each of the datagrams that define the virtual circuit assigned to the second link so that the address data corresponds to the second link rather than to the first link. As such, the collective throughput requirement of the plurality of datagrams is distributed among the plurality of links thereby increasing the speed of data transmission between the remote node and the local node.

Other objects and features will be in part apparent and in part pointed out hereinafter.

BRIEF DESCRIPTION OF THE DRAWINGS

Corresponding reference characters indicate corresponding parts through the drawings.

DETAILED DESCRIPTION OF PREFERRED EMBODIMENTS

Figure 1:
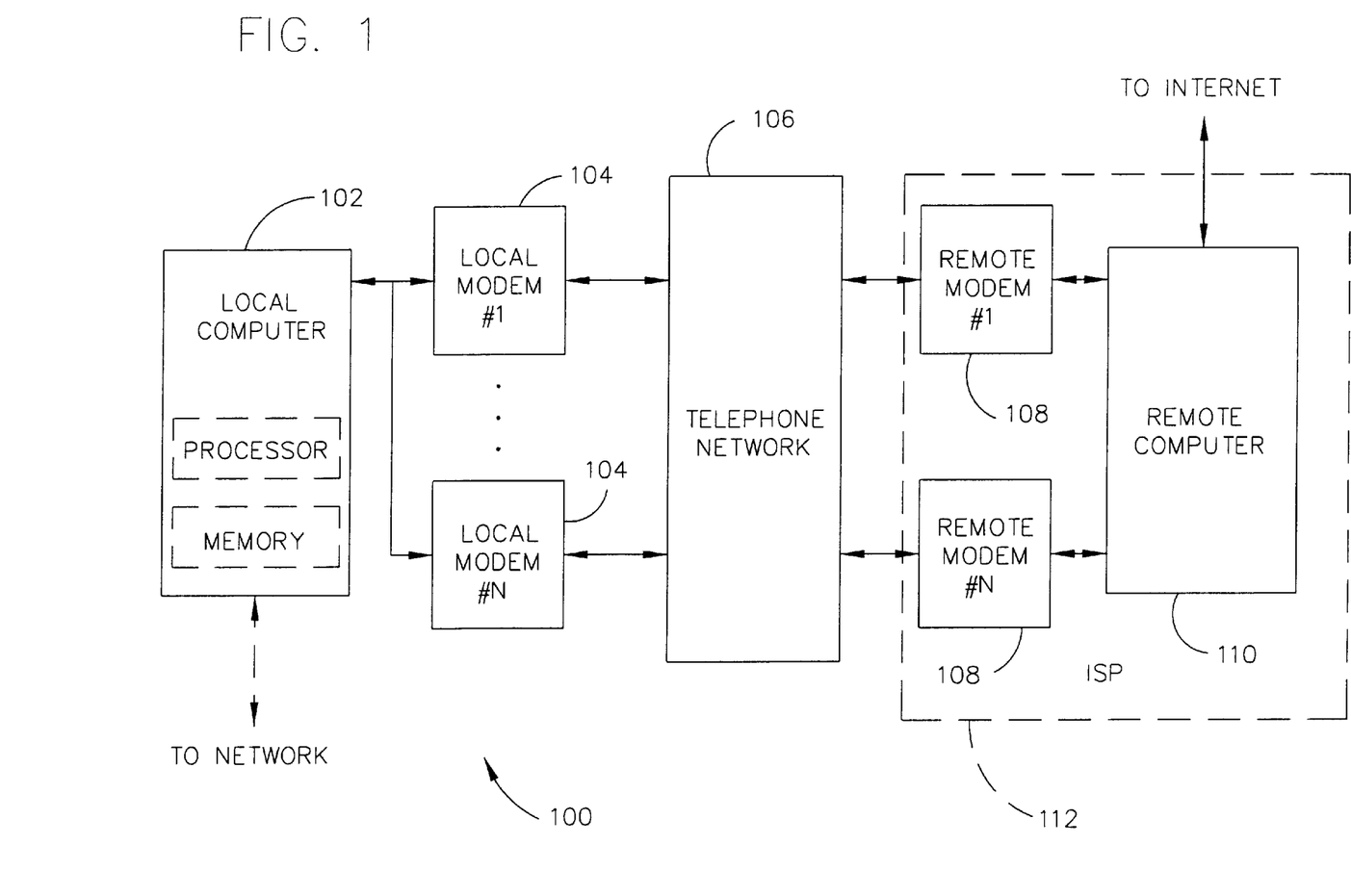
FIG. 1 is a block diagram of a computer system according to a preferred embodiment of the invention.

Referring now to the drawings, FIG. 1 shows a computer system 100 according to a preferred embodiment of the present invention. As illustrated, the computer system 100 includes a local computer 102 connected to a plurality of physical data links or connections, such as local modems 104. In one embodiment, the local computer 102 is a stand-alone personal computer. In the alternative, local computer 102 is, for example, either a workstation or router on a local area network.

As shown in FIG. 1, a telephone network 106 connects the local modems 104 to another plurality of physical data links or connections, such as remote modems 108. Preferably, the number of remote modems 108 is greater than or equal to the number of local modems 104. It is to be understood that the combination of the telephone network 106 and modems 104, 108 may be alternatively embodied by other known computer data transmission hardware without deviating from the scope of the present invention. For example, T-1, ISDN, or other hardwired connections may be used instead of or in addition to modems.

According to the invention, a server, embodied by a remote computer 110 to which each of the modems 108 is connected, provides local computer 102 with access to remote digital data via modems 104, 108 and telephone network 106. For example, remote modems 108 and computer 110 comprise an Internet service provider (ISP) 112 which serves as a router for connecting local computer 102 to the wide area network commonly referred to as the Internet. Although modems 108 are illustrated as part of a single ISP 112 for convenience, it is to be understood that they may be associated with different Internet service providers. Further, it is to be understood that in one preferred embodiment, local computer 102 and remote computer 110 are both nodes on a wide area network operating in accordance with an Internet protocol.

As described above, Internet connections provide computer users with access to a number of resources, including documents on the World Wide Web, a hypertext-based information service that allows web browser clients to access information from web servers. With an Internet connection, and using specific web browser software, a user can browse the World Wide Web. Examples of such software include Netscape Navigator™ and Microsoft Internet Explorer®.

Advantageously, computer system 100 provides increased bandwidth for improved web browsing. As will be described in detail below, computer system 100 divides traffic among multiple physical links (i.e., the plurality of modems 104 and their associated telephone lines) which improves data throughput and, thus, improves the speed at which web pages can be accessed by local computer 102.

A suite of protocols, referred to as TCP/IP, provides a standardized format for Internet data communication. The TCP/IP protocol suite is named for its two main protocols, i.e., the transmission control protocol (TCP) as described in Postel, J. B., "Transmission Control Protocol," RFC 793, September 1981, and the Internet protocol (IP) as described in Postel, J. B., "Internet Protocol," RFC 791, September 1991. In general, a protocol is a set of rules governing the information flow within a communications infrastructure to control format, timing, error essential correction and running order. Networks often use suites of protocols, with each protocol being responsible for one part of a communications function.

Figure 2:
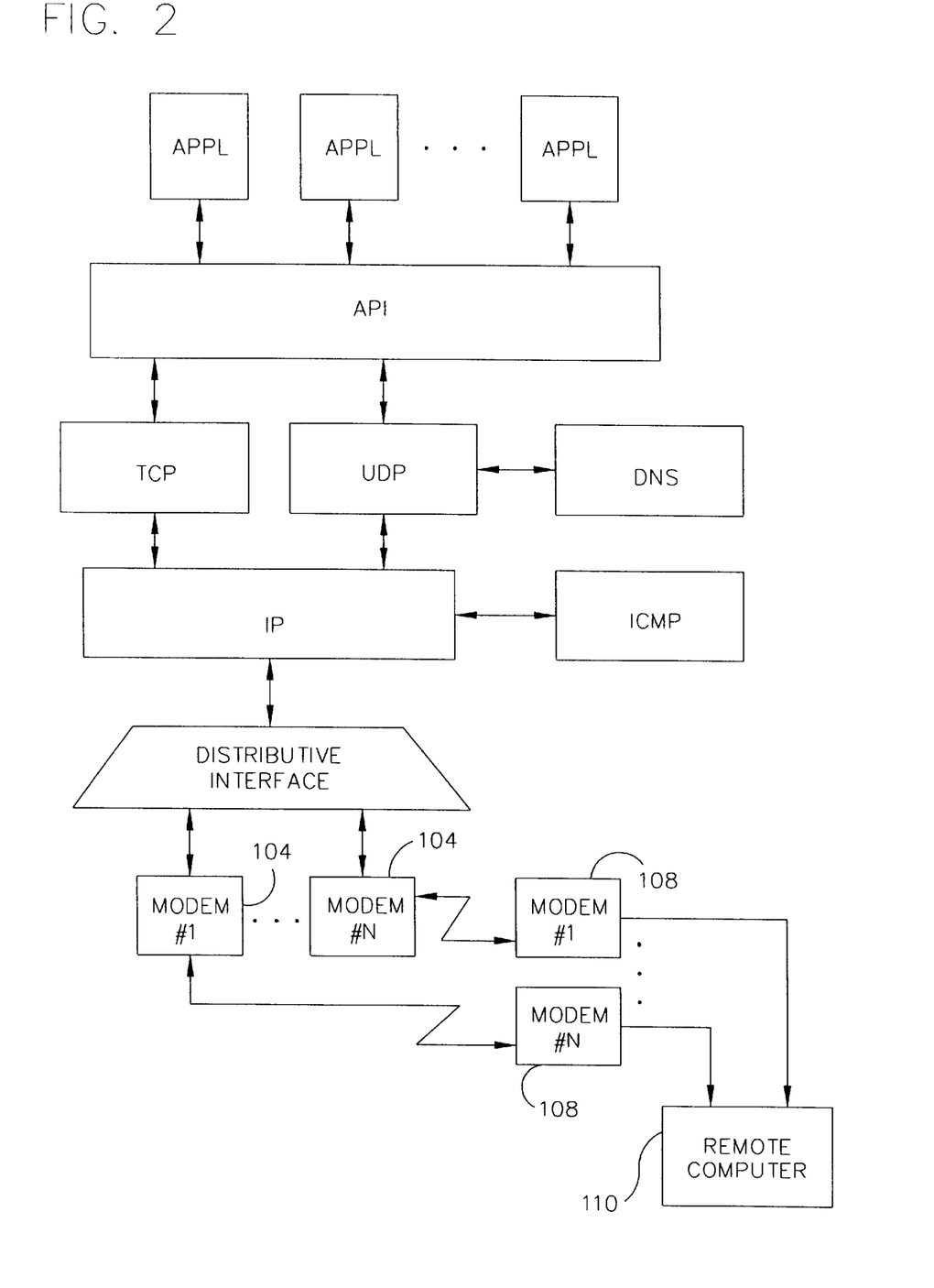
FIG. 2 is a block diagram of a protocol stack executed by the computer system of FIG. 1.

FIG. 2 illustrates a protocol stack embodying the present invention. Advantageously, computer system 100 implements the protocol stack of FIG. 2 to achieve improved throughput by distributing data among multiple physical links without requiring ISP 112 to use special equipment or software.

Networking protocols are usually developed in layers, with each layer responsible for a different facet of the communications. A protocol suite, such as TCP/IP, is the combination of different protocols at various layers. TCP/IP is a four layer system, each of which is illustrated in the exemplary protocol stack of FIG. 2. The four layers are commonly referred to as the link, network, transport and application layers.

The lower layer, i.e., the link layer, includes a device driver in the operating system software for providing an interface with the cable, modem or other type of physical link being used. For example, a conventional link layer includes a packet driver defined by Point-to-Point Protocol (PPP), Serial Line IP (SLIP), IEEE 802.3 or the like. According to the present invention, local computer 102 stores executable routines in its memory to implement a distributive network interface (described in detail in connection with FIGS. 3 and 4) in software which replaces the conventional link layer. As will be described in detail below, the interface of the invention provides the interface for computer 102 to local modems 104 and, further, to remote modems 108 and computer 110.

The network, transport and application layers are usually considered upper layers. The network layer, which includes the IP, handles the movement, or routing, of packets around the network. The Internet protocol is the TCP/IP standard protocol which defines the IP datagram as the unit of information passed across an Internet. In addition to IP, the network layer often includes the well-known protocols Internet control message protocol (ICMP), Internet group management protocol (IGMP) (not shown) and address resolution protocol (ARP) (not shown).

The transport layer includes a user datagram protocol (UDP) and TCP to provide a flow of data between hosts. As is well known in the art, TCP provides a reliable flow of data by means of checksums, acknowledgements of delivered data, timeouts and re-tries of failed transmissions. On the other hand, UDP provides a much simpler service to the application layer. It sends and receives packets of data, called datagrams, from one host to the other without guaranteeing or confirming delivery of the datagram to the remote end.

In general, software implementing the network and transport layers resides in the operating system of local computer 102.

The application layer, which includes an applications programming interface (API), provides an interface between the operating system and the particular applications being executed by computer 102. There are many common TCP/IP applications that almost every implementation provides. These include remote login, file transfer, mail transfer for electronic mail and network management. In addition, the application layer typically includes a web browser program.

When an application sends data using TCP, the protocols cause the data to be sent down the protocol stack through each layer, and then across the TCP/IP network. By attaching headers to the data that it receives, each layer adds information to the data. The unit of data that IP sends to the interface is called an IP datagram. In addition to application data, the IP datagram includes IP and TCP headers providing source and destination address information.

Since many different applications can use the transmission control or user datagram protocols at a given time, these protocols store an identifier in the headers they generate to identify the application. According to the protocols, both TCP and UDP use 16-bit port numbers to identify applications and store the source port number and the destination port number in their respective headers.

The Internet protocol provides a header checksum for verification that the information used in processing an Internet datagram has been transmitted correctly. The data itself, however, may contain errors. If the header checksum fails, the datagram is discarded by the end which detected the error.

As is known in the art, web documents, or pages, are usually made up of multiple objects such as blocks of text, images, programs, audio clips and/or video clips. A hypertext transfer protocol (HTTP), described in Fielding et al., "Hypertext Transfer Protocol—HTTP/1.1," RFC 2068, January 1997, provides for the transport of bitstreams representing these objects from the server (i.e., remote computer 110, or more accurately, the particular network computer being routed through remote computer 110) to local computer 102. As provided for by HTTP, only one object is transported at a time. Browser software often opens multiple HTTP sessions over a plurality of TCP/IP virtual circuit connections, thereby loading multiple objects in parallel. Unfortunately, this does not speed up loading of the entire web page because the total bandwidth of the underlying IP connection is divided among the TCP/HTTP connections assigned to loading individual objects.

Outside of web browsing, many Internet activities involve multiple, parallel TCP/IP links. Delivery of e-mail while browsing or downloading a file and viewing multiple sources of live video during a video conference are examples. The ability of the invention's interface to use multiple physical links without cooperation of remote computer 110 depends on this plurality of virtual circuits during web browsing and other activities. Web browsing, file downloading and other common consumer applications typically cause much more data to be routed toward local computer 102 than away from it destined for the server or, in this instance, remote computer 110. While it would be a simple matter to divide outbound traffic between multiple physical links, the fact that the real bottleneck is inbound necessitates a method and system for stimulating servers to divide reply data between multiple links. As such, the distributive network interface of the invention presents an interface to local computer 102 emulating a single connection to the network and presents an interface to remote computer 110 emulating a plurality of connections from local nodes.

For purposes of describing the present invention, the term virtual circuit or connection refers to a link that behaves like a dedicated point to point line or a system that delivers packets in sequence, as happens on an actual point to point network. Since there is no prearrangement, each virtual connection exists only for the duration of that one transmission. In other words, a virtual circuit is representative of the exchange of datagrams between a server and client for transmitting an object from the server to the client.

The distributive interface of the present invention is implemented in software as part of the TCP/IP protocol stack. Preferably, the interface replaces the PPP or SLIP protocol driver, for example, at the bottom of the stack. In operation, the interface establishes its own PPP, for example, connection over each physical link (i.e., modem 104). At the client end, local computer 102 assigns a unique IP address to each of these physical connections. This is the address to which IP packets must be addressed to be delivered to the client computer 102 over that connection. The TCP/IP protocol software attaches this address as a "from" address in each packet. Thus, when a TCP connection is established for an HTTP object load, for example, server computer 110 uses this return address to direct the reply data back to the requesting client.

In general, web browser software is designed such that local computer 102 is only able to communicate with a specified subset of the Internet via a port associated with a single IP address. For this reason, the distributive interface of the invention is connected as shown in FIG. 2 with its top end connected to a TCP/IP protocol stack having only one address and with its bottom end connected to multiple ISP ports, via PPP for example. Advantageously, communication between each of the multiple ISP ports and the interface proceeds as if local computer 102 has a plurality of different addresses.

Preferably, the interface assigns any one of the physical link addresses to the overlying TCP/IP stack. In effect, ISP 112 perceives that it is connected to two individual client computers whereas the interface equipped computer 102 perceives that it is connected by a single fast link to a single ISP 112. The latter condition is a requirement for current software protocol drivers and applications to function without modification.

Once the connection is established, the distributive interface dissects each packet outbound from local computer 102 and identifies those which are requests to establish new TCP/IP virtual connections (e.g., a SYN packet). Computer 102 executes, for example, a round robin rotation algorithm to decide which modem 104 to use for the new TCP/IP connection and then records this decision in an internal data structure. The connection will remain assigned to the particular physical link until it is closed by either end. As computer 102 passes each packet (including the initial connect request) from the overlying TCP/IP stack to the interface, computer 102 executes the distributive interface for examining the packet's headers. In this manner, computer 102 decides if it the packet is part of one of the assigned virtual connections. If so, and if the IP address of that link differs from that of the overlying stack, the interface re-writes the return address in the header to match that of the link and corrects the IP and TCP checksums to be correct for the new address. The interface then sends the packet out on the associated physical link. At the far end, a reply from remote computer 110 will be directed to the (modified) return address and will return to local computer 102 over the associated link. The interface examines all packets received on each link that has an address differing from the main IP address and modifies the destination address to match the IP stack's address and again corrects the checksums.

The interface further monitors the inbound and outbound packets to detect disconnection (e.g., a FIN or RST packet) of TCP/IP connections so it can update its data structure and maintain information regarding the number of connections assigned to each physical link.

As such, computer 102 executes the distributive interface to cause remote routing equipment to return information to local computer 102 on one of a plurality of links selected by local computer 102. This is accomplished by modifying the IP source address encoded in every IP packet to match the IP address of the desired return link. Advantageously, it is not necessary for the source address in the packet to match the IP address of the outbound link even though the source address determines the link over which replies will be routed. Therefore, load balancing between the outbound links may be accomplished independently of load balancing the inbound links. Further, load balancing between the outbound links may be performed on a packet by packet basis in contrast to the inbound direction which must be on a per-TCP connection basis.

Figure 3:
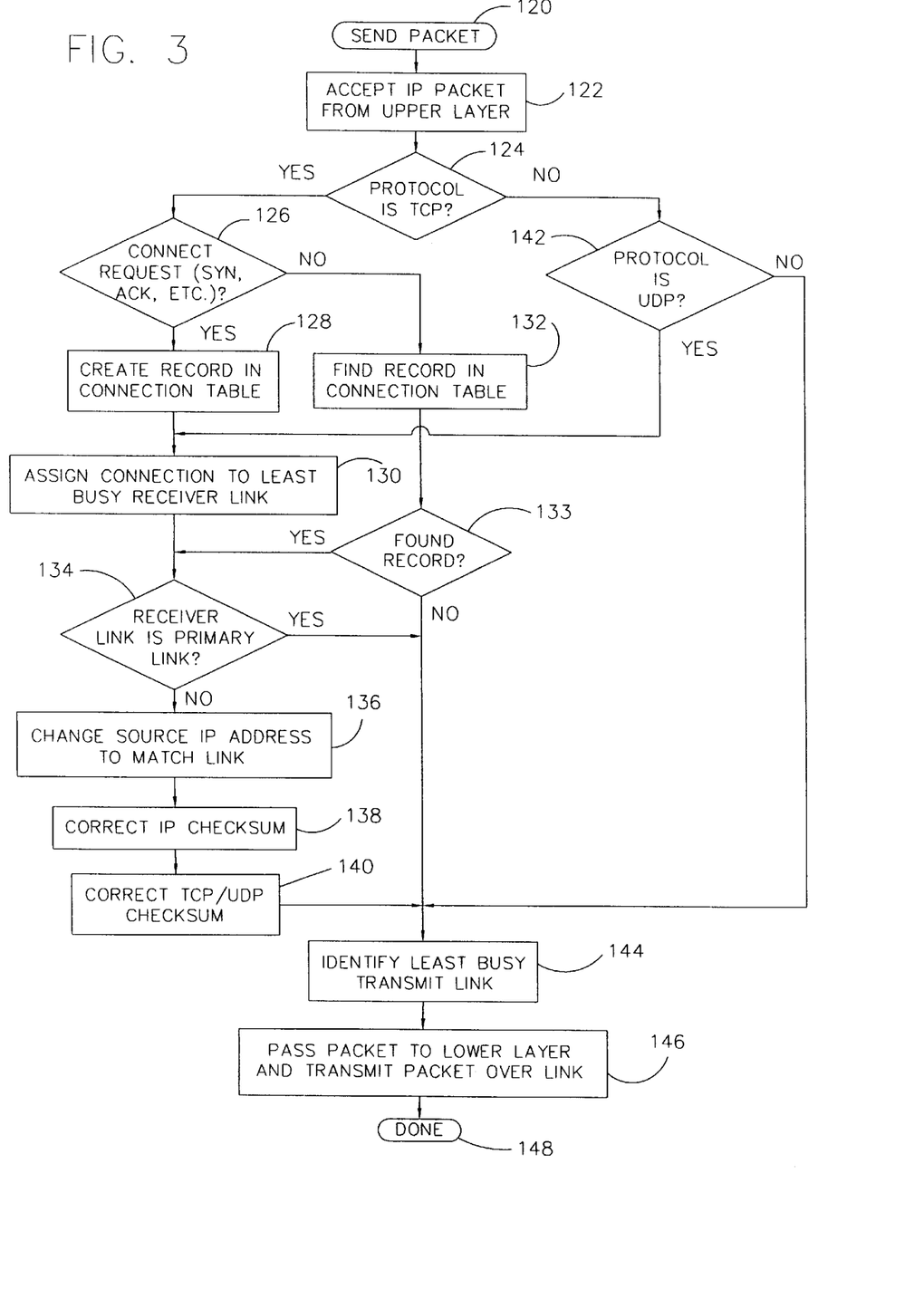
FIG. 3 is an exemplary flow diagram illustrating a routine for sending an outbound data packet to a remote computer according to a preferred embodiment of the invention.
Figure 4:
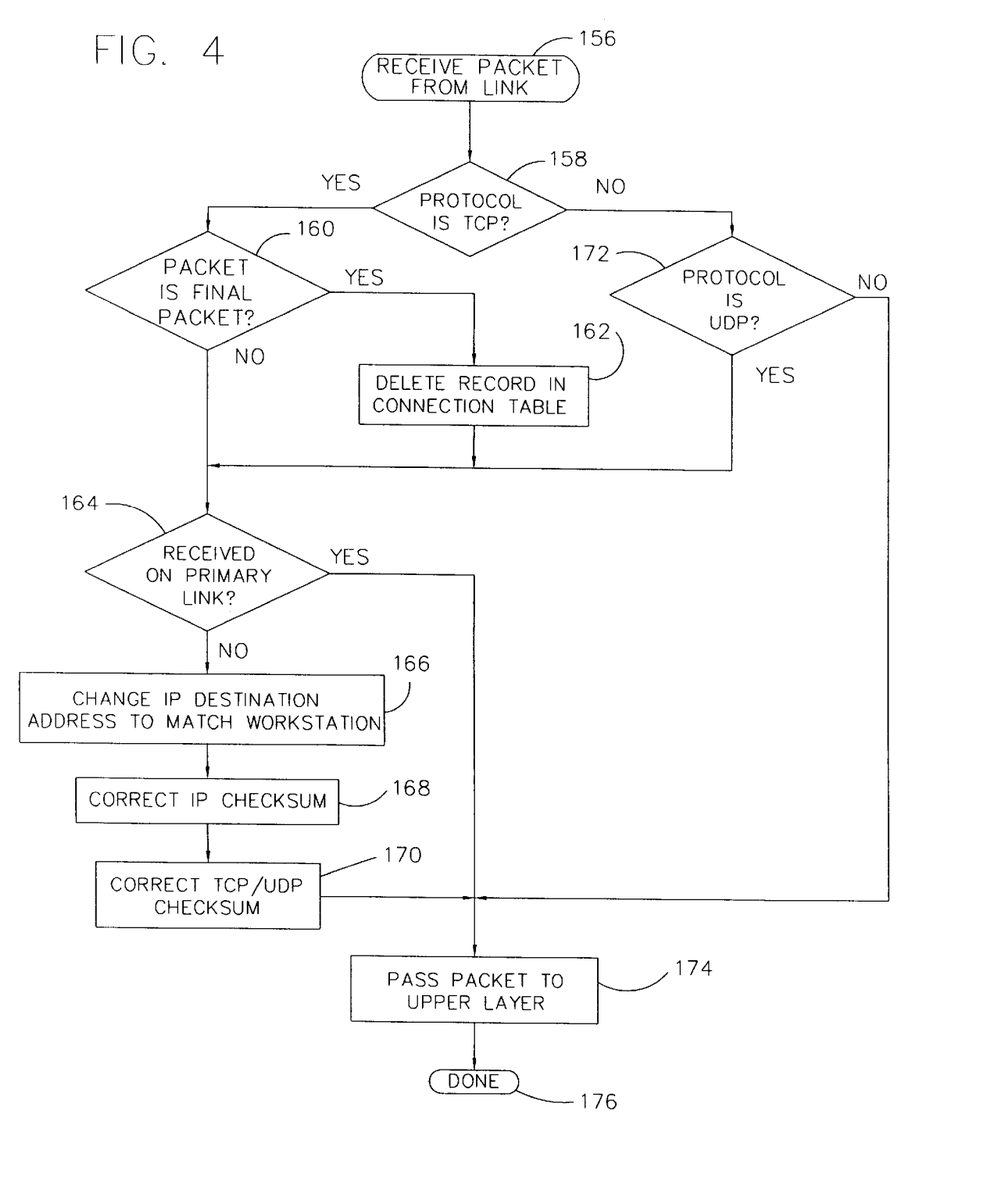
FIG. 4 is an exemplary flow diagram illustrating a routine for receiving an inbound data packet from a remote computer according to a preferred embodiment of the invention.

Referring now to the flow diagrams of FIGS. 3 and 4, a preferred embodiment of the invention's interface includes a set of software programs installed on computer 102. Preferably, one of these programs is a driver which replaces the existing PPP driver and attaches to the TCP/IP protocol stack and the drivers for the serial ports. As an example, the software is operable with the Microsoft Windows NT® operating system. FIGS. 3 and 4 exemplify software executed by local computer 102. For convenience, the software is described with respect to two modems 104. It is to be understood that the principles exemplified in FIGS. 3 and 4 are not limited to only two physical links but can be extended to more than two modems 104.

The packet transmission process begins when the IP stack, implemented according to standard industry practice, desires to transmit an outbound packet to the remote network. According to the invention, local computer 102 executes a send packet routine 120 as shown in FIG. 3. Beginning at step 122, computer 102 accepts the IP packet from the upper layer of the protocol stack. At step 124, computer 102 examines the protocol field of the IP header to determine if the packet is a TCP packet. If this is true, the packet is part of a TCP connection session eligible to use one of the secondary links (i.e. those links whose IP address differs from the nominal IP address of local computer 102 and the overlying IP stack). Proceeding to step 126, computer 102 recognizes a TCP connection open request packet by the presence of the SYN flag and absence of the ACK flag in the TCP header. When such a connection establishment packet is recognized, computer 102 proceeds to step 128 to allocate a record in a table to remember the physical link (i.e., which of local modems 104) to which the connection is assigned. This assignment must not change over the life of the connection. That is, all future packets for this connection must use the same IP source address as the initial, connection open, packet.

For example, the invention creates a TCP connection table having one entry for each TCP connection (i.e., virtual circuit). Each entry comprises a set of data including: 1) a local port number which uniquely identifies the connection; 2) information on which link is being used to remember which link to receive replies on; and 3) state information to keep track of the state of connection to help identify the final packet.

At step 130, further processing the connection open packet, computer 102 decides which of the physical links to use for receiving the inbound packets for this connection. Typically the connection will be assigned to the link which is least busy receiving. This assignment is recorded in the connection table. Advantageously, computer 102 makes the assignment locally, i.e., independent of remote computer 110.

On the other hand, if computer 102 determines at step 126 that the TCP packet is not a connection establishment packet, it assumes that a connection has already been established and that a table entry has already been created for the connection. In this case, computer 102 locates the table entry corresponding to the connection in the connection table at step 132 by matching the local TCP port number in the packet to that recorded in the associated record in the table. If a record corresponding to the packet cannot be found in the connection table, then the packet is part of an inbound TCP connection established at the request of the remote node. In this case, the connection must remain associated with the primary link. As shown at step 133, the send algorithm should take no special action for such packets. The presence of the FIN and ACK flags in outbound packets should be noted in the connection table record for use by the receiving process in identifying connection close packets.

Proceeding to step 134, computer 102 determines if the assigned link is the primary link. If not, computer 102 controls the link on which reply data will be received by altering the IP source address at step 136. Because IP packets include checksum fields to ensure the integrity of the data, modification of the IP address requires that the IP and TCP/UDP checksums be corrected to match the modified packet. It is not necessary to recompute the checksum from scratch. It is only necessary to add to the checksum the difference between the original IP address and the replacement address. Computer 102 corrects the IP and TCP or UDP checksums at steps 138 and 140, respectively, to reflect the changed IP address of the assigned link. At step 134, if the assigned link is the primary link, no such alteration is required. Since the structure of outbound packets for other protocols is not necessarily known, it is not safe to alter the IP address of IP sub-protocols other than TCP, UDP, ICMP, and IGMP.

If computer 102 determines at step 124 that the protocol field of the IP header indicates that the packet is not a TCP packet, then computer 102 proceeds to step 142. At step 142, computer 102 examines the protocol field of the IP header to determine if the packet is a UDP packet. In this instance, computer 102 proceeds directly to step 130 if the packet is a UDP packet. Otherwise, computer 102 proceeds to step 144.

At step 144, computer 102 identifies the least busy transmit link. This usually occurs after the packet has been assigned a receive link and the IP and TCP headers altered as required, as shown in steps 136, 138 and 140. Computer 102 then transmits the packet to the remote network over this link at step 146 and ends at step 148.

Further to the invention, a preferred embodiment of the invention provides for the transport and network layer checksums to be corrected, or modified, as a function of the newly assigned IP address rather than being re-calculated in their entirety. In steps 138 and 140, computer 102 corrects the IP and TCP/UDP checksums after the secondary IP address is assigned. For example, the IP checksum for an outgoing datagram is the complement of a modulo $2^{16}$ one's complement sum of all of the 16-bit words that form the IP header. For purposes of computing the sum, the field containing the IP checksum itself is set to zero. The complement is used so it is possible to sum the words of the header including the checksum field and obtain a result of zero if the checksum verifies the validity of the header.

Because of associativity and commutivity of addition, it is possible to correct the header checksum for the change of a subset of the words of the header without summing the entire header from scratch as would be standard practice. This correction requires less processing than re-summing the entire header.

In this instance, addition and subtraction are performed in one's complement arithmetic with a 16-bit word size. Since the sum is modulo $2^{16}$, overflows are of no concern. Since the complement of the sum is stored, computer 102 subtracts the difference between the new and old values of the modified words. For a change in one of the IP address fields, two words are modified. Computer 102 adds together the two words of the previous (i.e., before replacement) IP address and then subtracts from this sum each word of the replacement IP address. Computer 102 saves the value computed to this point for use in the TCP/UDP checksum correction as described below. For now, computer 102 adds the current IP header checksum (corresponding to the previous IP address). The result is the checksum for the header with the new address with which computer 102 overwrites the existing checksum.

For TCP and UDP, the respective headers do not include the IP address fields. However, the checksums for both of these protocols include a pseudo-header that does contain IP address fields for both source and destination nodes. Therefore, the same calculation described above must be applied to the TCP or UDP header checksum if the packet being altered is in one of these protocols. In the TCP or UDP case, the improved efficiency of the method and system taught herein is even more important than for the IP header checksum since the TCP or UDP sum encompasses all of the bytes in the packet (plus the pseudo-header). A slight additional performance gain can be realized by only computing the difference between the old and new addresses once and using this same difference to correct both the IP header checksum and that of the TCP or UDP header.

Referring now to FIG. 4, the packet receive process begins when any link completes reception of the IP packet. According to the invention, local computer 102 executes a receive packet routine 156 by first receiving the IP packet from the link. At step 158, computer 102 examines the protocol field of the IP header to determine if the packet is a TCP packet. If so, computer 102 locates the corresponding connection record in the connection table.

Proceeding to step 160, computer 102 uses the flags in the packet and the connection state information in the connection table record to determine if the present packet is the last packet of a connection session. If so, computer 102 proceeds to step 162 to remove the associated record from the connection table. Following either step 160 or 162, computer 102 proceeds to step 164 in which it determines if the packet was received on any link but the primary. If the packet was not received on the primary link, the destination IP address in the packet corresponds to the link and not to the IP address of the overlying IP stack and local computer 102. In this case, computer 102 alters the destination IP address at step 166 and corrects the IP and TCP checksums at steps 168 and 170, respectively.

If computer 102 determines at step 158 that the protocol field of the IP header indicates that the packet is not a TCP packet, then computer 102 proceeds to step 172. At step 172, computer 102 examines the protocol field of the IP header to determine if the packet is a UDP packet. In this instance, computer 102 proceeds directly to step 164 if the packet is a UDP packet. Otherwise, computer 102 proceeds to step 174.

At step 174, computer 102 passes the packet to the upper IP layer of the protocol stack and then processes it in a conventional manner. This usually occurs after the IP and TCP headers have been altered as required, as shown in steps 166, 168 and 170. Computer 102 then ends at step 176.

In a preferred embodiment, computer 102 stores information regarding the receive process to maintain statistics about the amount of traffic over each link for use by the transmission process in determining which link to assign to future new connections.

Figure 5A:
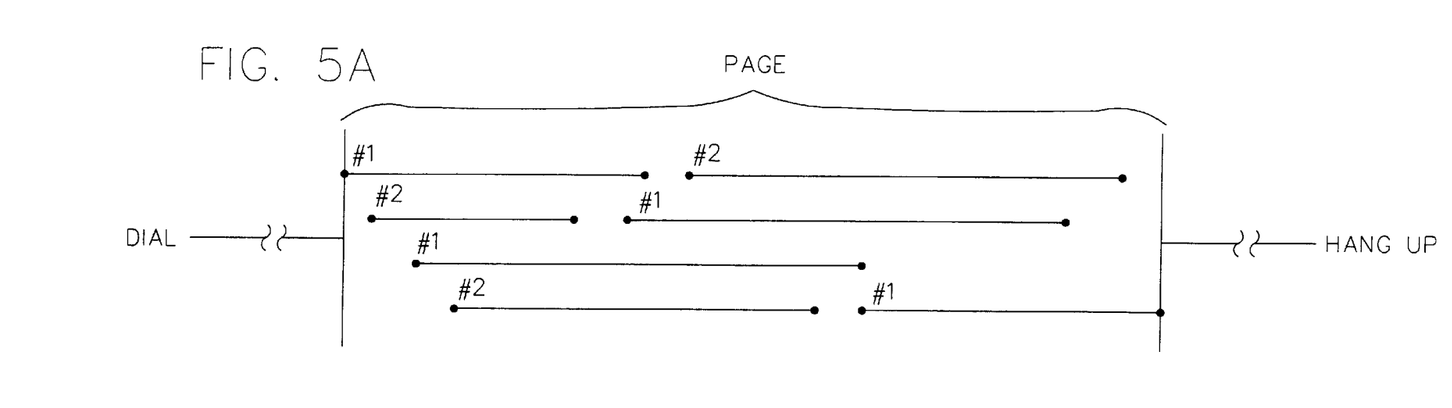
FIGS. 5A and 5B are exemplary timing diagrams illustrating virtual connections for downloading a multiple object document from a server.
Figure 5B:
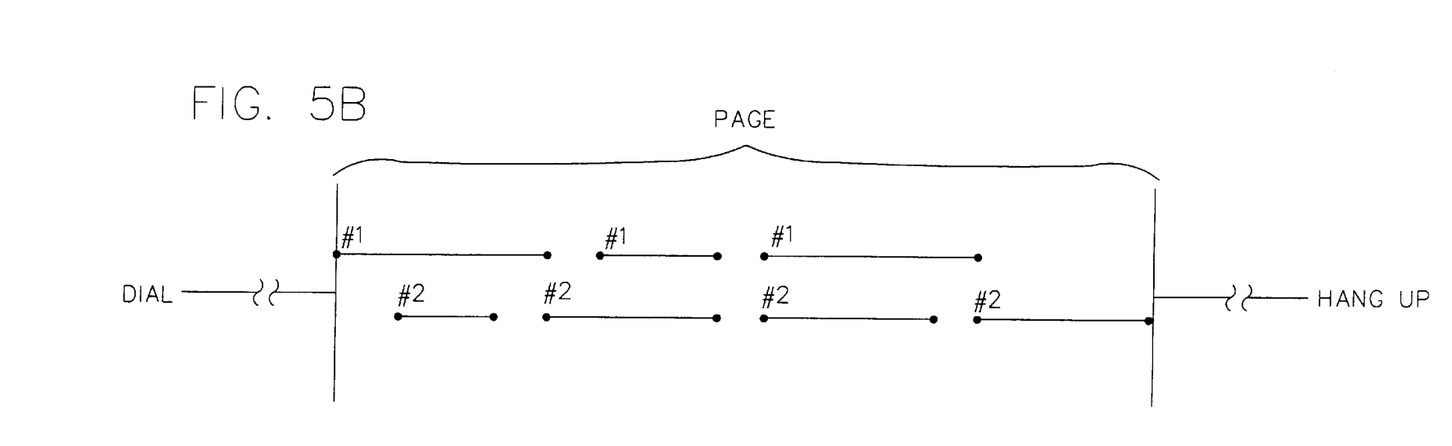

Referring now to FIGS. 5A and 5B, two exemplary timing diagrams are shown to illustrate the selection of modem 104 for locally assigning the connection to the least busy receiver link. In these examples, two modems 104, designated modem #1 and modem #2, are used for receiving data from remote computer 110. In particular, FIG. 5A shows the downloading of a web page in accordance with a round robin algorithm. Typically, web browser software only permits four connections at a given time. Thus, as shown in FIG. 5A, the distributive interface of the invention assigns the first and third connections to the primary link and the second and fourth connections to the secondary link. Generally, each of the connections includes the exchange of a connect request and acknowledgement, followed by the exchange of a query and reply and the exchange of acknowledgements and replies, and ending with the exchange of a finish request and acknowledgement. If further connections are needed to fully access the web page, additional connections are assigned to alternating modems 104 as shown in FIG. 5A.

FIG. 5B shows a modified round robin algorithm for locally assigning the connection to the least busy receiver link. As shown in FIG. 5B, the interface limits the number of connections at a given time to the number of available modems 104. As such, each modem 104 only handles a single connection at a time which improves the speed at which data is transmitted. In this instance, the interface assigns the first connection to the primary link and the second connection to the secondary link. As one of the connections ends, the interface assigns the next connection to the newly open link. This prevents the possibility of two connections being assigned to one link and no connections being assigned to the other.

As is apparent from the above description of the invention, it is possible to break all but one physical link and have the Internet web browsing session continue at normal speed over the remaining link. A preferred embodiment makes use of this to allow users to free up a telephone line on demand to place or receive (e.g., if equipped with "call waiting") an independent telephone call such as a voice call or facsimile transmission. Although described in connection with the TCP/IP suite of protocols, it is to be understood that the present invention may be applied to various other computer networks operating according to other protocols without deviating from the scope of the invention.

As described above, system 100 controls data transmissions between a remote node and a local node of a computer communications network. In the illustrated embodiment, local computer 102 constitutes a local node and remote computer 110 constitutes a remote node. The local node has a plurality of physical data links (e.g., modems 104) connected to it for connecting the local node to the network. The network, described above as a wide area network, has a plurality of nodes, including the local node and the remote node, interconnected for the exchange of datagrams. As understood to one skilled in the art, the datagrams being exchanged define a plurality of virtual circuits between the local node and the remote node. In this instance, at least one local-to-remote datagram and at least one remote-to-local datagram are used to define a virtual circuit.

In operation, the local computer 102 of system 100 establishes a connection from the local node to the remote node via a first link (e.g., a primary local modem 104). Next, the processor of computer 102 executes routines stored in its memory for assigning one of the virtual circuits to the first link and assigning another one of the virtual circuits to a second link (e.g., a secondary local modem 104). Similarly, depending on the number of links connected to local computer 102 and the number of virtual circuits defined by the datagrams, computer 102 may assign the remaining virtual circuits to the first and second links or to even more links connected to the local node. After assigning the virtual circuits to the links, computer 102 distributes the collective throughput requirement of the datagrams among the links by receiving the remote-to-local datagrams of the assigned virtual circuits via their respective links. In this manner, system 100 increases the speed of data transmission between the remote node and the local node. Advantageously, this is accomplished without special equipment or software methods at the remote end.

On the other hand, computer 102 need not transmit the local-to-remote datagrams via the link to which they are assigned. Rather, computer 102 may transmit the local-to-remote datagrams via whichever link is least busy at the time. In other words, computer 102 transmits the local-to-remote datagrams of one virtual circuit via one link and the local-to-remote datagrams of another virtual circuit via another link independent of the links via which the remote-to-local datagrams are received.

In order to assign the virtual circuits to different links, computer 102 alters address data in the datagrams that define a particular virtual circuit. Datagrams have headers made up of a number of words. For example, one of these words represents address data. According to the invention, each of the datagrams being exchanged between the local and remote nodes of the network includes either source or destination address data corresponding to one of the links connected to the local node. Preferably, computer 102 alters the address data in each of the datagrams that define a particular virtual circuit so that the address data corresponds to, for example, the secondary link rather than the primary link. To alter the address data, computer 102 executes routines stored in its memory to alter the headers of the local-to-remote datagrams so that the source address corresponds to a desired one of the links for receiving the remote-to-local datagrams regardless of the link via which the local-to-remote datagrams are transmitted.

Computer 102 then alters the checksum, which is another word in the header of a datagram. In general, the checksum is a function of all of the words in the header and is used for error detection. In a preferred embodiment, computer 102 alters, or corrects, the checksum for the datagrams in the defined virtual circuit so that they are a function of the address data corresponding to, for example, the secondary link rather than the primary link. The interface executed by computer 102 corrects the checksum by substituting a portion of it that is representative of the address data corresponding to, for example, the primary link with the address data corresponding to the secondary link.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of controlling data transmissions between a remote node and a local node of a computer communications network, said network having a plurality of nodes interconnected for the exchange of datagrams, said local node having a plurality of physical data links connected thereto for connecting the local node to the network, said datagrams defining a plurality of virtual circuits between the local node and the remote node, each datagram including either source or destination address data corresponding to one of the links, each virtual circuit being defined by at least one local-to-remote datagram and at least one remote to local datagram, said method comprising the steps of:

establishing a connection from the local node to the remote node via a first one of the links;

assigning one of the virtual circuits to the first link;

assigning another one of the virtual circuits to a second one of the links, said step of assigning the virtual circuit to the second link including altering the address data at the local node in each of the datagrams that define the virtual circuit assigned to the second link so that the address data corresponds to the second link rather than to the first link; and receiving the remote-to-local datagrams of the assigned virtual circuits via their respective links whereby the collective throughput requirement of the plurality of datagrams is distributed among the plurality of links thereby increasing the speed of data transmission between the remote node and the local node.

2. The method of claim 1 wherein each of said datagrams has a header comprising a plurality of words, one of said words representing the address data, and wherein the step of altering the address data includes altering the headers of the local-to-remote datagrams so that the source address corresponds to a desired one of the links for receiving the remote-to-local datagrams regardless of the link via which the local-to-remote datagrams are transmitted.

3. The method of claim 1 further comprising the step of transmitting the local-to-remote datagrams of the assigned virtual circuits via one or more of the links independent of the links via which the remote-to-local datagrams are received.

4. The method of claim 1 further comprising the step of storing in a memory data identifying which of the virtual circuits are assigned to the links.

5. The method of claim 1 wherein the local node includes a memory and further comprising the step of storing executable routines in the memory providing an interface between the links and the local node.

6. A method of controlling data transmissions between a remote node and a local node of a computer communications network, said network having a plurality of nodes interconnected for the exchange of datagrams, said local node having a plurality of physical data links connected thereto for connecting the local node to the network, said datagrams defining a plurality of virtual circuits between the local node and the remote node, each of said datagrams including either source or destination address data corresponding to one of the links and having a header comprising a plurality of words, one of said words representing the address data, another of said words in the header representing a checksum for use in error detection, said checksum being a function of the plurality of words in the header, each virtual circuit being defined by at least one local-to-remote datagram and at least one remote-to-local datagram, said method comprising the steps of:

establishing a connection from the local node to the remote node via a first one of the links;

assigning one of the virtual circuits to the first link;

assigning another one of the virtual circuits to a second one of the links, said step of assigning the virtual circuit to the second link including altering the address data in each of the datagrams that define the virtual circuit assigned to the second link so that the address data corresponds to the second link rather than to the first link and altering the checksum so that the checksum is a function of the address data corresponding to the second link rather than the address data corresponding to the first link, said step of altering the address data including altering the headers of the local-to-remote datagrams so that the source address corresponds to a desired one of the links for receiving the remote-to-local datagrams regardless of the link via which the local-to-remote datagrams are transmitted; and receiving the remote-to-local datagrams of the assigned virtual circuits via their respective links whereby the collective throughput requirement of the plurality of datagrams is distributed among the plurality of links thereby increasing the speed of data transmission between the remote node and the local node.

7. The method of claim 6 wherein the step of altering the checksum comprises substituting a portion of the checksum representative of the address data corresponding to the first link with the address data corresponding to the second link.

8. A method of controlling data transmissions between a remote node and a local node of a computer communications network, said network having a plurality of nodes interconnected for the exchange of datagrams, said local node having a plurality of physical data links connected thereto for connecting the local node to the network, said datagrams defining a plurality of virtual circuits between the local node and the remote node, each virtual circuit being defined by at least one local-to-remote datagram and at least one remote-to-local datagram, each of said datagrams comprising a plurality of words, one of said words representing address data corresponding to one of the links, another one of said words representing a checksum for use in error detection, said method comprising the steps of:

assigning one of the virtual circuits to a first one of the links;

assigning another one of the virtual circuits to a second one of the links;

altering the address data in each of the datagrams that define the virtual circuit assigned to the second link so that the address data corresponds to the second link rather than to the first link; and altering the checksum in each of the datagrams that define the virtual circuit assigned to the second link so that the checksum is a function of the address data corresponding to the second link rather than the address data corresponding to the first link.

9. A system for communicating with a remote node of a computer communications network, said network having a plurality of nodes interconnected for the exchange of datagrams, said system comprising:

a local node for transmitting datagrams to and receiving datagrams from the remote node, said datagrams defining a plurality of virtual circuits between the local node and the remote node, each datagram including either source or destination address data corresponding to one of the links, each virtual circuit being defined by at least one local-to-remote datagram and at least one remote-to-local datagram;

a plurality of physical data links connected to the local node for connecting the local node to the network;

an interface between the local node and the links for establishing a connection from the local node to the remote node via a first one of the links, said interface assigning one of the virtual circuits to the first link and assigning another one of the virtual circuits to a second one of the links, said interface including a processor at the local node executing a software program having a plurality of routines, said processor executing a routine for altering the address data in each of the datagrams that define the virtual circuit assigned to the second link so that the address data corresponds to the second link rather than to the first link, said local node receiving the remote-to-local datagrams of the assigned virtual circuits via their respective links whereby the collective throughput requirement of the plurality of datagrams is distributed among the plurality of links thereby increasing the speed of data transmission between the remote node and the local node.

10. The system of claim 9 wherein each of said datagrams has a header comprising a plurality of words, one of said words representing the address data, and wherein the processor executes a routine for altering the headers of the local-to-remote datagrams so that the source address corresponds to a desired one of the links for receiving the remote-to-local datagrams regardless of the link via which the local-to-remote datagrams are transmitted.

11. The system of claim 9 wherein the local node includes a memory storing executable routines implementing the interface.

12. The system of claim 11 further comprising a data table stored in the memory identifying which of the virtual circuits are assigned to the links.

13. The system of claim 9 wherein the local node comprises a local workstation computer.

14. The system of claim 9 wherein the local node comprises a local area network router.

15. A system for communicating with a remote node of a computer communications network said network having a plurality of nodes interconnected for the exchange of datagrams said system comprising:

a local node for transmitting datagrams to and receiving datagrams from the remote node, said datagrams defining a plurality of virtual circuits between the local node and the remote node, each of said datagrams including either source or destination address data corresponding to one of the links and having a header comprising a plurality of words one of said words in the header representing the address data another of said words in the header representing a checksum for use in error detection, said checksum being a function of the plurality of words in the header, each virtual circuit being defined by at least one local-to-remote datagram and at least one remote-to-local datagram:

a plurality of physical data links connected to the local node for connecting the local node to the network:

an interface between the local node and the links for establishing a connection from the local node to the remote node via a first one of the links said interface assigning one of the virtual circuits to the first link and assigning another one of the virtual circuits to a second one of the links, said interface including a processor executing a software program having a plurality of routines, said processor executing a routine for altering the address data in each of the datagrams that define the virtual circuit assigned to the second link so that the address data corresponds to the second link rather than to the first link and a routine for altering the checksum so that the checksum is a function of the address data corresponding to the second link rather than the address data corresponding to the first link, said processor further executing a routine for altering the headers of the local-to-remote datagrams so that the source address corresponds to a desired one of the links for receiving the remote-to-local datagrams regardless of the link via which the local-to-remote datagrams are transmitted, said local node receiving the remote-to-local datagrams of the assigned virtual circuits via their respective links whereby the collective throughput requirement of the plurality of datagrams is distributed among the plurality of links thereby increasing the speed of data transmission between the remote node and the local node.

16. The system of claim 15 wherein the processor executes a routine for substituting a portion of the checksum representative of the address data corresponding to the first link with the address data corresponding to the second link thereby altering the checksum.

17. In a system controlling data transmissions between a remote node and a local node of a computer communications network, said network having a plurality of nodes interconnected for the exchange of datagrams, said local node having a plurality of physical data links connected thereto for connecting the local node to the network, said datagrams defining a plurality of virtual circuits between the local node and the remote node, each virtual circuit being defined by at least one local-to-remote datagram and at least one remote-to-local datagram, each of said datagrams comprising a plurality of words, one of said words representing address data corresponding to one of the links, another one of said words representing a checksum for use in error detection, an improvement including an interface between the local node and the links comprising:

a routine for assigning one of the virtual circuits to a first one of the links;

a routine for assigning another one of the virtual circuits to a second one of the links; and a routine for altering the address data at the local node in each of the datagrams that define the virtual circuit assigned to the second link so that the address data corresponds to the second link rather than to the first link whereby the collective throughput requirement of the plurality of datagrams is distributed among the plurality of links thereby increasing the speed of data transmission between the remote node and the local node.

* * * * *